United States Patent [19]
Merritt et al.

[11] Patent Number: 5,366,821
[45] Date of Patent: Nov. 22, 1994

[54] CONSTANT VOLTAGE FUEL CELL WITH IMPROVED REACTANT SUPPLY AND CONTROL SYSTEM

[75] Inventors: Robert D. Merritt, Vancouver; James D. Blair, Burnaby, both of Canada

[73] Assignee: Ballard Power Systems Inc., North Vancouver, Canada

[21] Appl. No.: 850,570

[22] Filed: Mar. 13, 1992

[51] Int. Cl.⁵ .................................. H01M 8/06
[52] U.S. Cl. ........................... 429/21; 429/22
[58] Field of Search .............. 429/21, 22, 23, 24, 429/25

[56] References Cited

U.S. PATENT DOCUMENTS

| | | | |
|---|---|---|---|
| 3,134,697 | 5/1964 | Niedrach . | |
| 3,268,364 | 8/1966 | Cade et al. . | |
| 3,297,484 | 1/1967 | Niedrach . | |
| 3,850,695 | 11/1974 | Keller et al. | 429/23 |
| 4,904,548 | 2/1990 | Tajima | 429/22 |
| 4,923,768 | 5/1990 | Kaneko et al. | 429/19 |
| 4,973,530 | 11/1990 | Vanderborgh et al. . | |
| 4,988,583 | 1/1991 | Watkins et al. . | |
| 5,141,824 | 8/1992 | Hirota | 429/22 |
| 5,156,926 | 10/1992 | Lemoine | 429/19 |

FOREIGN PATENT DOCUMENTS

| | | |
|---|---|---|
| 0293007 | 11/1988 | European Pat. Off. . |
| 1439600 | 4/1966 | France . |
| 2139110 | 11/1984 | United Kingdom . |

OTHER PUBLICATIONS

Patent Abstracts of Japan, vol. 13, No. 232, May 29, 1989 (JP, A, 10 38 969, Feb. 9, 1989).
Patent Abstracts of Japan, vol. 16, No. 246, Jun. 5, 1992 (JP, A, 40 51 466, Feb. 19, 1992).
Patent Abstracts of Japan, vol. 13, No. 352, Aug. 8, 1989 (JP, A, 11 12 671, May 1, 1989).
Patent Abstracts of Japan, vol. 13, No. 321, Jul. 20, 1989 (JP, A, 10 89 158, Apr. 3, 1989).

*Primary Examiner*—Olik Chaudhuri
*Assistant Examiner*—C. Everhart
*Attorney, Agent, or Firm*—McAndrews, Held & Malloy, Ltd.

[57] ABSTRACT

A method and apparatus for providing a substantially constant output voltage from a fuel cell, notwithstanding output current variations, is disclosed. The voltage and secondarily the current of the cell is determined at least periodically. The pressure of the reactant gas in the fuel cell is then regulated so substantially the nominal voltage is maintained. The temperature in the fuel cell may also be regulated to maintain the nominal output voltage. Also, a method and apparatus for minimizing the parasitic power drain in a electric power generation system is disclosed. The fuel cell is fed with an reactant gas by a compressor driven by parasitic power drawn from the fuel cell. The method is carried out by determining that the output current of the fuel cell has changed, and changing one or more or the pressure, the mass flow rate and the reactant utilization ratio of the reactant in the fuel cell, thereby changing the amount of the parasitic power drawn from the electrical power output to drive the compressor.

23 Claims, 4 Drawing Sheets

CONSTANT VOLTAGE FUEL CELL WITH IMPROVED REACTANT SUPPLY AND CONTROL SYSTEM

FIELD OF THE INVENTION

The present invention relates to electrochemical fuel cells. More particularly, the present invention relates to a fuel cell based electric power generation system having an improved reactant supply and control system.

BACKGROUND OF THE INVENTION

Electrochemical fuel cells generate electrical energy by converting chemical energy derived from a fuel directly into electrical energy by the oxidation of the fuel in the cell. A typical fuel cell includes an anode, a cathode and an electrolyte. Fuel and an oxidant are supplied to the anode and cathode, respectively. At the anode, the fuel permeates the electrode material and reacts at the anode catalyst layer to form cations, which migrate through the electrolyte to the cathode. At the cathode, the oxidant (for example, oxygen or an oxygen containing gas supply) reacts at the cathode catalyst layer to form anions. The anions formed at the cathode react with the cations to form a reaction product. The fuel cell generates a useable electric current and the reaction product is removed from the cell.

In electrochemical fuel cells employing hydrogen as the fuel and oxygen-containing air (or pure oxygen) as the oxidant, a catalyzed reaction at the anode produces hydrogen cations from the fuel supply. An ion exchange membrane facilitates the migration of hydrogen ions (protons) from the anode to the cathode. In addition to conducting hydrogen cations, the membrane isolates the hydrogen fuel stream from the oxidant stream comprising oxygen containing air. At the cathode, oxygen reacts at the catalyst layer to form anions. The anions formed at the cathode react with the hydrogen ions that have crossed the membrane to form liquid water as the reaction product.

The anode and cathode reactions in such fuel cells are shown in equations (1) and (2) below:

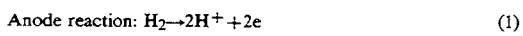

Anode reaction: $H_2 \rightarrow 2H^+ + 2e$  (1)

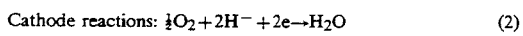

Cathode reactions: $\tfrac{1}{2}O_2 + 2H^- + 2e \rightarrow H_2O$  (2)

Solid polymer fuel cells generally contain a membrane electrode assembly ("MEA") consisting of a solid polymer electrolyte or ion exchange membrane disposed between two electrodes formed of porous, electrically conductive sheet material. The electrodes are typically formed of carbon fiber paper, and are generally impregnated or coated with a hydrophobic polymer, such as polytetrafluoroethylene. The MEA contains a layer of catalyst at each membrane/electrode interface to induce the desired electrochemical reaction. A finely divided platinum catalyst is typically employed. The MEA is in turn disposed between two electrically conductive plates, each of which has at least one flow passage engraved or milled therein. These fluid flow field plates are typically formed of graphite. The flow passages direct the fuel and oxidant to the respective electrodes, namely, the anode on the fuel side and the cathode on the oxidant side. The electrodes are electrically coupled to provide a path for conducting electrons between the electrodes.

In a single cell arrangement, fluid flow field plates are provided on each of the anode and cathode sides. The plates act as current collectors, provide support for the electrodes, provide access channels for the fuel and oxidant to the respective anode and cathode surfaces, and provide channels for the removal of water formed during operation of the cell.

Two or more fuel cells can be connected together in series or in parallel to increase the overall power output of the assembly. In such arrangements, the cells are typically connected in series. One side of a given plate serves as an anode plate for one cell and the other side of the plate is the cathode plate for the adjacent cell. Such a series connected multiple fuel cell arrangement is referred to as a fuel cell stack, and is usually held together by tie rods and end plates.

The stack typically includes feed manifolds or inlets for directing the fuel (substantially pure hydrogen, methanol reformate or natural gas reformate) and the oxidant (substantially pure oxygen or oxygen containing air) to the anode and cathode flow field channels. Exhaust manifolds or outlets are typically provided for expelling the unreacted fuel and oxidant gases, each carrying entrained water.

The stack also usually includes a feed manifold or inlet for directing the coolant fluid, typically water, to interior channels within the stack to absorb heat generated by the exothermic reaction of hydrogen and oxygen within the fuel cells. An outlet manifold allows the coolant water to leave the stack.

In fuel cells employing hydrogen as the active constituent of the fuel and oxygen as the active constituent of the oxidant, the fuel can be supplied as substantially pure hydrogen or as a hydrogen containing reformate as, for example, the product of the reformation of methanol and water or the reformation of natural gas. Similarly, the oxidant can be supplied as substantially pure oxygen or as oxygen-containing air.

The reactants are commonly humidified before they enter the stack so they will not dry out, and thus damage, the membranes separating the anode and cathode of each cell. Such membranes generally require the presence of water to effect ion transport.

The fuel cells are typically flooded with the selected fuel and the oxidant at a constant pressure. The pressure is generally controlled by a regulator at the source of the reactant. When an electrical load is placed on the circuit connecting the electrodes, the fuel and oxidant are consumed in direct proportion to the electrical current drawn by the load.

Each reactant stream exiting the stack generally contains the water added to humidify it. The oxidant stream exiting the stack also generally contains product water generated at the cathodes of the fuel cells. The excess water extracted from one or both of the reactant streams exiting the fuel cell is accumulated in a separator or knockout drum. The excess water can be recirculated and used as a coolant or drained from the system.

When one of the reactants used in the fuel cell is substantially pure hydrogen or oxygen, the unconsumed reactant exiting the fuel cell stack may be recirculated to minimize waste. After the excess water is removed from the unconsumed reactant, it is recirculated and merged with the fresh reactant stream upstream of the inlet to the fuel cell stack.

When one of the reactants is a dilute reactant, such as a reformate or air, the unconsumed portion of the reactant stream exiting the fuel cell stack may be recirculated, particularly if it is the fuel stream. However, the dilute reactant is more often discarded after it passes through the fuel cell once, particularly when the dilute reactant is air. The excess water in the unconsumed portion of the reactant is generally removed in a separator or knockout drum and then drained. The unconsumed portion of the reactant stream is then vented to the atmosphere.

It is advantageous to integrate the fuel cell product water stream with the coolant stream, and thereby use the product water generated electrochemically in the fuel cell stack to regulate the temperature of the stack. In this regard, the use of product water as the coolant avoids the need to provide a separate external source of coolant fluid, since the water generated by the cell is itself a suitable coolant fluid.

Now consider in particular a fuel cell system in which the hydrogen is recirculated in the system until it is substantially consumed entirely, while the oxygen is provided in dilute form as air. In one such system, the air is discharged after passing through the fuel cell one time, and before its oxygen content is substantially exhausted. In such a system it is useful to define reactant utilization ratios.

The oxygen utilization ratio is defined herein as the amount of the oxygen constituent delivered to the fuel cell per unit time divided by the amount of the oxygen constituent consumed in the fuel cell per unit time. More generally, a reactant utilization ratio can be defined. This ratio is defined herein as the amount of the active constituent of one reactant which is delivered to the fuel cell input per unit time divided by the amount of the active constituent of that reactant consumed in the fuel cell per unit time.

To avoid the inefficiency inherent in extracting the entire active constituent of a reactant supplied to the fuel cell, each reactant utilization ratio is generally maintained at a level substantially higher than 1.0. Exemplary oxygen utilization ratios for fuel cells are about 1.2 to about 3.0, preferably about 1.7 to about 2.2, and most preferably about 2.0. If the hydrogen or other fuel is recirculated and thus substantially completely consumed, the oxygen utilization ratio also represents the excess oxygen supplied, compared to the stoichiometric amount of oxygen consumed by the reaction with hydrogen to make water.

One way to improve the efficiency of a fuel cell power generation system is to optimize the reactant utilization ratios, and particularly the oxygen utilization ratio, in the fuel cell for the chosen operating conditions. (The hydrogen utilization ratio may also be optimized, within the scope of the present invention. In the illustrated embodiment as operated by the inventors, however, excess hydrogen is present and oxygen is the limiting reactant. Under these circumstances the inventors prefer to regulate the oxygen utilization ratio, rather than the hydrogen utilization ratio).

One consideration in optimizing the oxygen utilization ratio for a fuel cell is the power output of the fuel cell at any given time. In most practical systems, the fuel cell must have a variable power output so it can provide more or less power as needed. There is thus a need to optimize the oxygen utilization ratio, according to the transient power output of the fuel cell, to improve efficiency.

A complicating factor in optimizing the oxygen utilization ratio of a fuel cell is the variation in the amount of electrical power required to operate the fuel cell system under various electrical output and fuel cell operating conditions. Power is commonly diverted from the fuel cell's electrical output to operate the pumps, control systems, and other supporting apparatus of the fuel cell system itself. This diverted power is commonly referred to, and will be referred to herein, as "parasitic power." The parasitic power requirement of the cell reduces the gross power output, as the parasitic power required to operate the fuel cell's supporting equipment must be subtracted from the gross power output of the cell to yield the net power available for delivery to the primary load powered by the fuel cell.

The amount of parasitic power required to operate the fuel cell system varies substantially with changes in the power output and other operating conditions of the fuel cell. For example, an increase in the net power output demanded of the fuel cell may also increase the amount of parasitic power which must be drawn from the cell to meet the increased net power demand. The gross power demand thus will increase more than the net power demand increase.

If the oxygen utilization ratio is high, as it typically is under high net power output conditions, the amount of parasitic power drawn from the fuel cell is high as well. This is particularly true for an ambient air-breathing fuel cell, where air is compressed before entering the fuel cell. Compression in an ambient-air system is usually accomplished by operating a compressor either fully or partially (i.e., supplemented by a flywheel or the like) on parasitic power. The amount of compressor parasitic power is proportional to the pressure and mass flow rate of the compressed air. If the oxygen utilization ratio is high, most of the air which is compressed, and particularly its inert nitrogen constituent, is not utilized in the fuel cell.

The parasitic power increase necessary to increase the gross power output of the fuel cell can be so great as to defeat the purpose of increasing the gross power output of the fuel cell. Much of the increase in the gross power output is lost to the increase in the parasitic power load under certain operating conditions.

On the other hand, when the net power demand decreases or is low, there is a corresponding need to reduce the parasitic power load required to operate the fuel cell. Otherwise, the fuel cell system will not be well adapted to conserve fuel when the net power demand decreases or is low.

Another problem in the art is how to provide a fuel cell power generation system having a substantially constant output voltage, even when its load current varies. Many electrical devices, particularly inverters for converting DC to AC power, require a substantially uniform voltage to operate efficiently, and to avoid damage if the variation in voltage is sufficiently large. However, as is demonstrated graphically in FIG. 1, in a fuel cell operated at a uniform pressure and temperature, the voltage output will change if the load (i.e., output) current changes. This presents a problem which must be solved if the fuel cell is to provide a constant voltage, notwithstanding changes in its output current.

Yet another problem in the art is how to independently and automatically regulate the pressure and mass flow rate of a reactant gas in a fuel cell power generation system. In prior systems, both the pressure and the mass flow rate of each reactant gas have been controlled upstream of the fuel cell, with the fuel cell and downstream apparatus representing a fixed resistance to flow (which, at the most, could be varied manually, as by adjusting an exhaust valve or the like). It has thus not been feasible to automatically vary the pressure of a reactant gas within the fuel cell, independent of the automatic regulation of the mass flow rate of the reactant gas within the fuel cell. For reasons which will become clearer later, it is often desirable to control these variables independently and automatically, so the fuel cell can respond optimally to variations in its electrical power output.

Accordingly, an object of the present invention is to optimize the reactant utilization in a fuel cell under various operating conditions.

Another object of the present invention is to provide a fuel cell power generation system having a substantially constant output voltage, even when its load current varies.

An additional object of the invention is to control the pressure of a reactant gas in the fuel cell in order to maintain a substantially constant voltage output.

Another object of the invention is to control the temperature in the fuel cell to maintain a substantially constant voltage output.

An additional object of the invention is to minimize the parasitic power drain in a fuel cell based electric power generation system, particularly when the system is operating at reduced net power demand levels.

Yet another object of the invention is to simultaneously regulate the pressure and mass flow rate of a reactant gas in an electric power generation system including at least one fuel cell.

One or more of the preceding objects, or one or more other objects which will become apparent upon consideration of the present specification, are satisfied by the invention described herein.

Summary of the Invention

One aspect of the invention is a method for regulating the utilization of at least one of the reactants in a fuel cell. In one contemplated type of fuel cell, the reactant gases are an oxidant gas and a fuel gas. The oxidant gas contains oxygen as its reactant constituent and optionally contains the other components of air as inert constituents. The fuel gas contains hydrogen as the reactant constituent and optionally contains the other constituents of a reformate (e.g., natural gas reformate, methanol reformate, and combinations thereof) as inert constituents. The fuel cell has an input and an output for each reactant gas.

The method includes the steps of providing the reactant gas to the reactant input and selecting a reactant utilization ratio for the fuel cell. This ratio is defined as the amount of the reactant delivered to the fuel cell input per unit time divided by the amount of the reactant consumed in the fuel cell per unit time. The reactant consumption is generally directly proportional to fuel cell output current. A mass flow rate of the reactant gas is determined so as to provide the selected reactant utilization ratio.

The actual mass flow rate of the reactant gas is measured at the reactant gas input of the fuel cell. The mass flow rate of the reactant gas is regulated by a flow control valve at the reactant gas output of the fuel cell. The flow calculator, which is responsive primarily to the fuel cell output current and secondarily to the mass flow rate measured at the reactant gas input, actuates the flow control valve. This regulation maintains the mass flow rate of the reactant gas determined to be appropriate to provide the desired reactant utilization ratio.

Another aspect of the present invention is a method of providing a substantially constant output voltage, notwithstanding output current variations, in a fuel cell based electric power generation system. The system includes an input of a reactant gas, and an electrical output characterized by a voltage and a current. The method includes the steps of choosing a nominal output voltage of the fuel cell, and at least periodically (and in normal practice, continuously) determining the voltage and optionally the current of the electrical output of the fuel cell. The pressure and optionally the temperature of the reactant gas in the fuel cell is regulated, in response to the voltage and optionally in response to the current of the electrical output, so substantially the nominal voltage is maintained.

An additional aspect of the invention is a method of minimizing the parasitic power drain in a electric power generation system. The system includes at least one fuel cell which has a variable electrical power output capability. The fuel cell is fed with a reactant gas by a compressor driven by parasitic power drawn from the fuel cell.

The method is carried out by determining that the output current of the fuel cell has changed, and changing the mass flow rate while maintaining substantially constant the pressure and reactant utilization ratio of the reactant in the fuel cell by changing the amount of the parasitic power drawn from the electrical power output to drive the compressor. Secondarily, both the pressure and the mass flow rate can be changed while maintaining substantially constant the reactant utilization ratio of the reactant in the fuel cell to respond to changes in the output current of the fuel cell. Alternatively, the pressure, mass flow rate and reactant utilization ratio of the reactant can be changed in response to changes in the output current of the fuel cell.

Still another aspect of the invention is apparatus specially constructed to carry out the methods described above.

Yet another aspect of the invention is apparatus for simultaneously regulating the pressure and mass flow rate of a reactant gas in an electric power generation system including at least one fuel cell. The regulating machinery includes apparatus for maintaining the reactant gas at a predetermined pressure at the reactant input to the fuel cell; apparatus for measuring the fuel cell current and apparatus for measuring the mass flow rate of the reactant gas at the reactant input of the fuel cell; and apparatus for regulating the mass flow rate of the reactant gas at the reactant output of the fuel cell, responsive to the fuel cell current and the mass flow rate measured at the reactant input, to maintain the necessary mass flow rate.

DETAILED DESCRIPTION OF THE INVENTION

While the invention will be described in connection with one or more preferred embodiments, it will be understood that the invention is not limited to those embodiments. On the contrary, the invention includes all alternatives, modifications, and equivalents as may be included within the spirit and scope of the appended claims.

Figure 1:
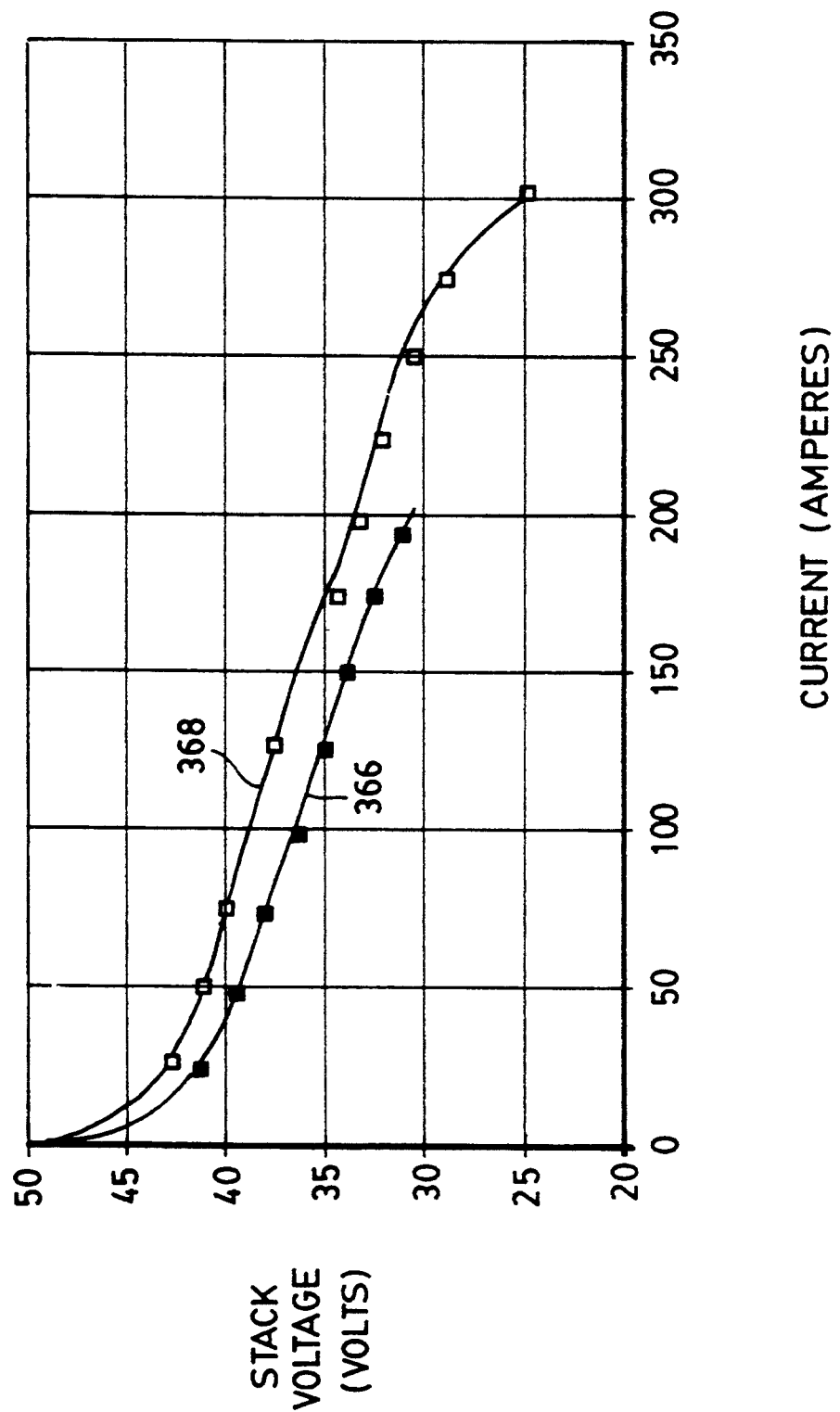
FIG. 1 is a plot of voltage versus current in a fuel cell. The two plots respectively correspond to operation under different temperature and pressure conditions.
Figure 2:
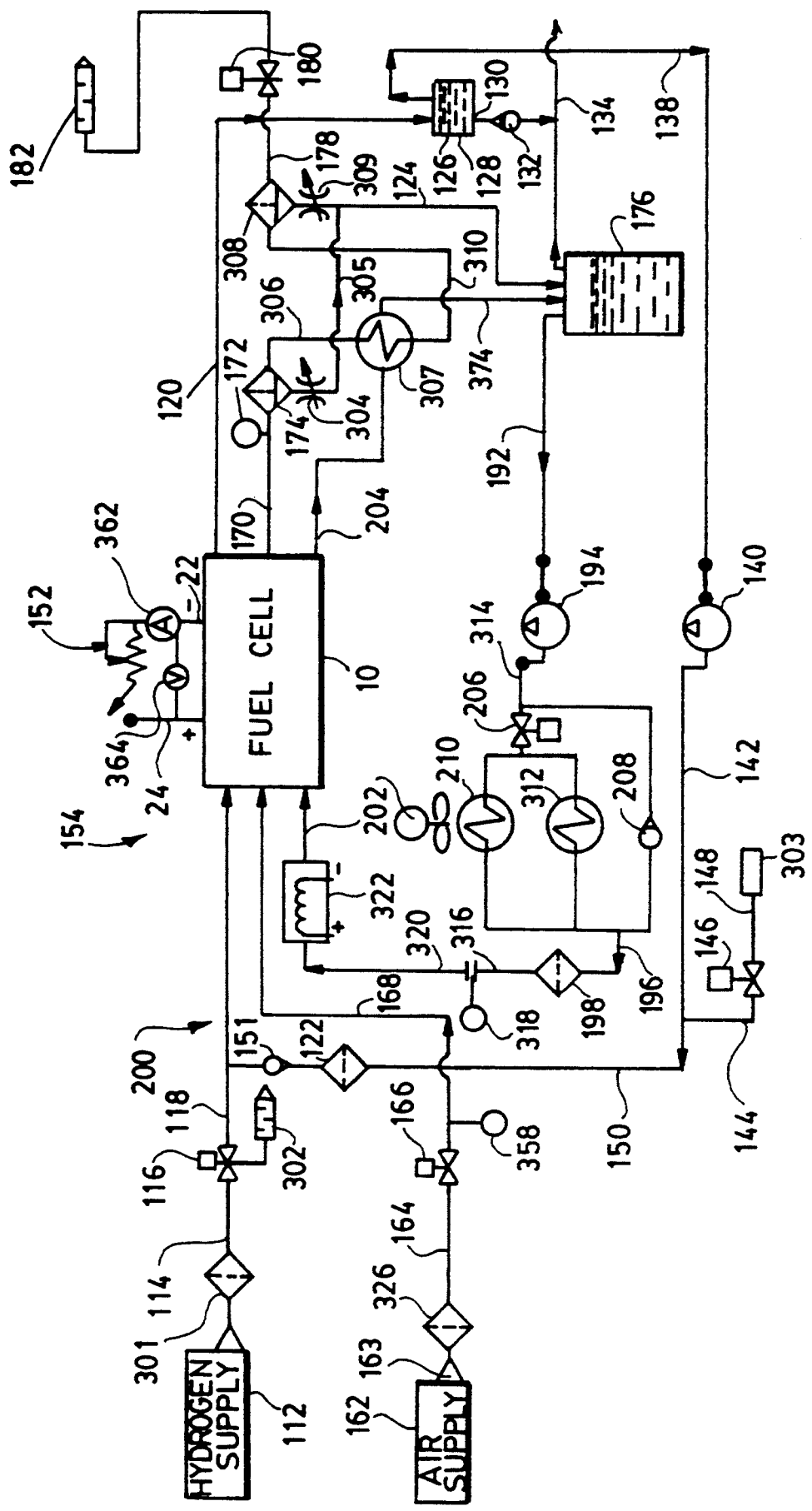
FIG. 2 is a schematic diagram of the fuel cell system according to the present invention.

Referring first to FIG. 2, an integrated fuel cell based electric power generation system 200 incorporates a fuel cell stack 10. The fuel cell stack 10 includes negative and positive bus plates 22 and 24, respectively, to which a circuit comprising a variable load 152 and a load switch 154 is electrically connected. In addition to the fuel cell stack 10, the integrated system includes a fuel (hydrogen) circuit, an oxidant (oxygen containing air) flow path, and a water circuit. The fuel cell stack 10 is more completely described in U.S. Pat. No. 05,200,278, (in FIGS. 1–6 and the accompanying text), which is incorporated herein by reference in its entirety.

The fuel circuit of the system 200 illustrated in FIG. 2 includes a pressurized, substantially pure hydrogen supply 112 having an inlet filter 301 and a fuel feed line 114 associated therewith. A three-way valve 116 is normally set to permit the flow of fuel from the supply 112 through the fuel input 118. Alternatively, the valve 116 can be shifted to isolate the hydrogen supply 112 and vent the fuel circuit via a muffler 302. The fuel stream is humidified in the humidification section of the stack 10, as described in the previously incorporated U.S. Pat. No. 5,200,278, and participates in the electrocatalytic oxidation of the fuel in the active section of the stack 10. The humidified fuel outlet stream 120 exits the fuel cell stack 10 and is fed to a water separator 126, in which a portion of the water from the stream 120 is removed, typically by condensation and the removed water is accumulated in a reservoir 128. The removed water is periodically drained from the reservoir 128 through a water drain valve 130, a check valve 132, and a drain line 134. The valve 130 permits water in the reservoir 128 to escape when the water exceeds a predetermined depth. The valve 130 is typically an integral component of the reservoir 128.

As shown in FIG. 2, the dehumidified fuel stream 138 exiting the water separator 126 is recirculated by a pump 140 through the return lines 142 and 150, a deionizing filter 122, and a check valve 151 to the fuel inlet stream 118. At periodic intervals, the dehumidified fuel stream in the line 142 is purged via the line 144 to expel contaminants accumulated within the stream. Such purging is accomplished by the actuation of a purge valve 146, which vents the dehumidified fuel stream to the atmosphere through a line 148 and a muffler 303. The dehumidified fuel stream in the line 142 is purged during start up to (1) expel excess water from the fuel flow channels of the stack 10, and (2) unload the pump 140 to facilitate its actuation.

The oxidant circuit of the system 200 includes an oxidant gas source 162 in the form of a pressurized air supply having oxidant feed line 163 leading, via an inlet filter 326, to an inlet line 164. In the illustrated embodiment of FIG. 2, the air from the oxidant gas source 162 contains approximately 20 percent oxygen, so the source 162 can be considered a dilute reactant source. An on-off valve 166 actuates the flow of oxidant from the source 162 to a line 168. A mass flow transducer 358 monitors the mass flow of oxidant in the line 168. The oxidant inlet stream passing via the line 168 enters the fuel cell stack 10, where the oxidant stream is humidified in the humidification section of the stack 10, as described in the U.S. Pat. No. 5,200,278, previously incorporated by reference in its entirety, and then participates in the electrocatalytic oxidation of the fuel in the active section of the stack 10. The oxidant outlet stream 170 exiting the fuel cell stack 10 contains, in addition to the unreacted gases, water from humidification and entrained product water. A thermocouple 172 measures the temperature of the oxidant outlet stream 170 just downstream from the exit from the fuel cell stack 10, and actuates an air circulation system associated with the coolant heat exchanger, as described below.

The humidified oxidant stream 170 exiting the fuel cell stack 10 is directed to a first water separator 174, as shown in FIG. 2. The water separator 174 removes the absorbed and entrained water from the stream 170. The preferred separator 174 is a coalescing filter containing a borosilicate glass fiber wool element on which water vapor readily condenses as the fuel gas passes through. The removed water is passed by a needle flow control valve 304, a line 305, and a line 124, and is accumulated in the reservoir 176. The excess water is drained from the reservoir 176 through a water drain line 134.

The oxidant gas exiting the separator 174 passes via a line 306 through a heat exchanger 307 which cools the oxidant gas, transferring heat to the coolant water exiting the stack 10 (as further described below). When the oxidant gas is cooled, its capacity to contain water vapor is reduced. The oxidant gas is then passed via a line 310 through a second coalescing filter 308. The filter 308 removes additional water which passes via the needle flow control valve 309 and the line 124 to the reservoir 176.

Since the oxidant in the illustrated embodiment is a dilute reactant, it is not recirculated in this embodiment. Instead, the dehumidified oxidant stream 178 is vented to the atmosphere through a variable-orifice control valve 180 and muffler line 182. The valve 180 is opened or closed to increase or decrease the oxidant flow rate through the system 200.

It will be understood that in embodiments employing substantially pure oxygen as the oxidant, the dehumidified oxidant stream 178 can be recirculated in a manner similar to the recirculation of the dehumidified fuel stream 138 described above.

The coolant circuit of the system 200 derives its coolant fluid from the water removed from the humidified oxidant stream 170 and accumulated in the reservoir 176. As shown in FIG. 2, a coolant water stream 192 exits the reservoir 176 and is pumped through a water circulation pump 194 to a heat exchanger assembly which includes parallel heat exchangers 210 and 312, a control valve 206, a check valve 208, and air circulation apparatus 222. The air circulation apparatus 222 is preferably one or more fans. During steady state operation, the valve 206 is opened to direct a coolant water stream 314 through heat exchangers 210 and 312, where the coolant water stream 314 transfers heat to another coolant fluid, preferably air, to produce a chilled coolant water stream 196.

The heat exchangers 210 and 312 are arranged in parallel to reduce their flow resistance to such a degree that the cooling water flows through them, instead of bypassing the heat exchangers via the valve 208, whenever the valve 206 is open. The air circulation apparatus 222 is actuated when the temperature of the humidified oxidant stream exiting the stack 10, as measured by the thermocouple 172, exceeds a predetermined value. During start up, or at other times when the coolant water is at or below its desirable temperature, the valve 206 is closed to bypass the heat exchanger 210 and divert a coolant water stream 314 via the valve 208 to the chilled water stream 196, substantially without removing heat from the stream 314.

As shown in FIG. 2, the chilled water stream 196 passes through a deionizing filter 198, a line 316, a flow switch 318, a line 320, and a water heater 322 to the water inlet 202 of the stack 10. (The flow switch 318 shuts down the fuel cell system 200 if no water is flowing from the line 316 to the line 320.)

The water heater 322 contains an electric heating coil which is turned on primarily to quickly bring the stack 10 up to its operating temperature at start-up, and secondarily to maintain a minimum operating temperature of the stack at other times. The water exiting the stack 10 passes via the line 204, the heat exchanger 307, and the line 374 to the reservoir 176.

Figure 3:
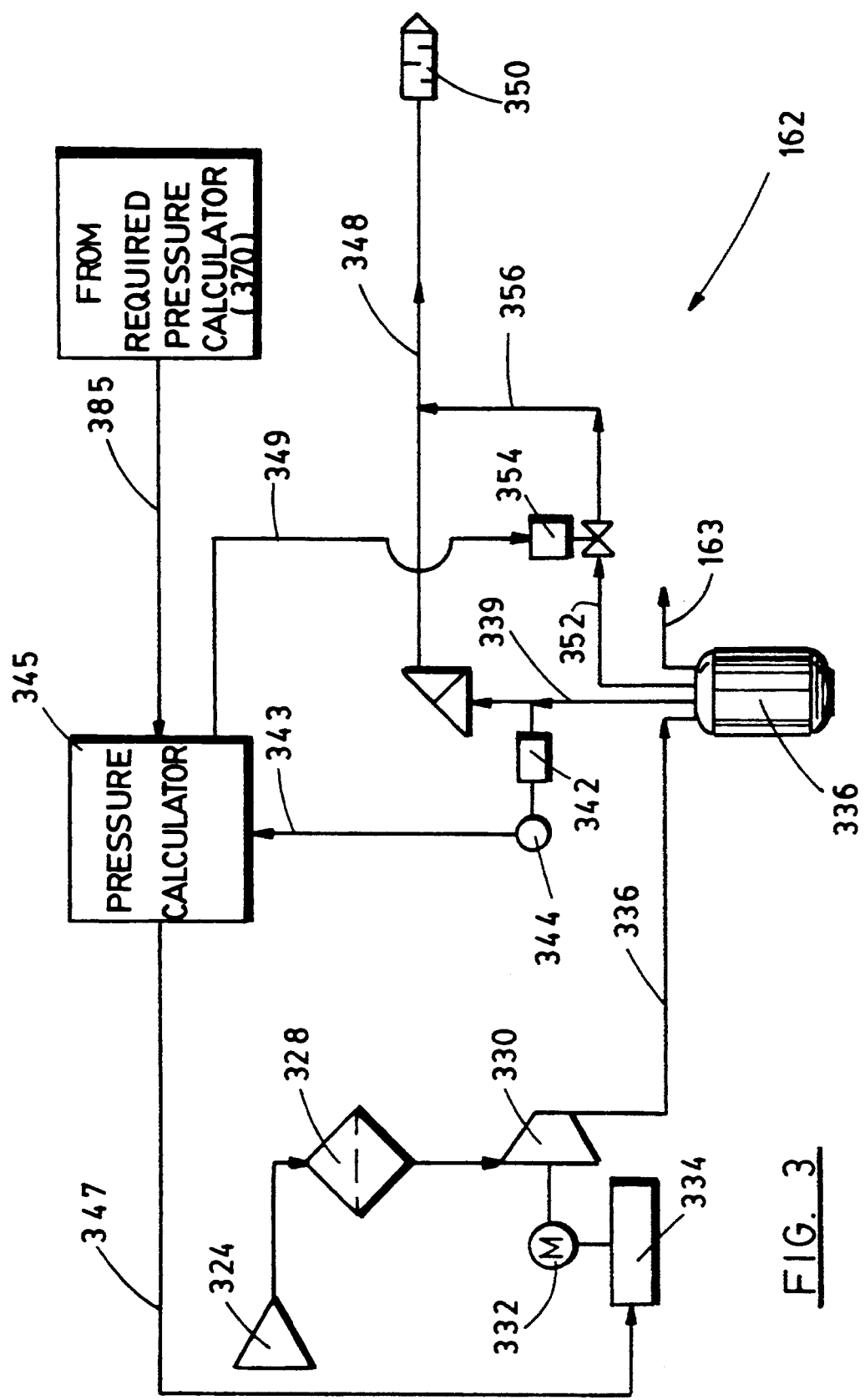
FIG. 3 is a schematic diagram of a compressor driven air supply according to the present invention for supplying air to the apparatus of FIG. 2.

Referring now to FIG. 3, a preferred oxidant gas source 162 (illustrated as a block on FIG. 2) is described in more detail. The source 162 includes an inlet 324 protected against the introduction of foreign matter by an air filter 328. The air filter 328 leads to a compressor 330, here a variable-speed, constant displacement compressor driven by a motor 332. The motor is controlled by a motor speed controller 334. The motor speed, and thus the air mass flow rate and the pressure, is controlled by a pressure controller 345, the purpose of which is explained more fully below.

Compressed air leaves the compressor 330 via the line 336 and enters a receiver 338. In one embodiment of the present invention, the pressure provided by the oxidant gas source 162 is varied by changing the set point of pressure controller 345, rather than by regulating the output to the line 163 from the receiver 338. The pressure controller 345 maintains the set point pressure, via a command signal 347 to motor speed controller 334, in a closed loop manner responsive to signal 343 from pressure transducer 344. A change in motor speed changes the air flow rate, which is also the mechanism by which pressure is changed. If this embodiment is used, the receiver 338 can be quite modest in capacity, and is maintained substantially at the supply pressure. In this embodiment, the primary purpose of the receiver 338 is not to store a substantial charge of compressed air, but to damp momentary fluctuations in the pressure output of the compressor 330 or demand fluctuations in the fuel cell system.

The receiver pressure is limited by a pressure relief path including the line 339, a snubber 342 leading to a pressure transducer 344 and a pressure relief valve 346 controlling the release of air via the exhaust line 348 to the muffler 350. The pressure relief valve 346 opens as necessary to keep the pressure in the receiver 338 from rising above a set point. If the air line is to be purged before ceasing operation, the valve 354 can be opened by signal 349 from pressure controller 345 to purge the contents of the receiver 338 to the lines 356 and 348 and then through the muffler 350.

Figure 4:
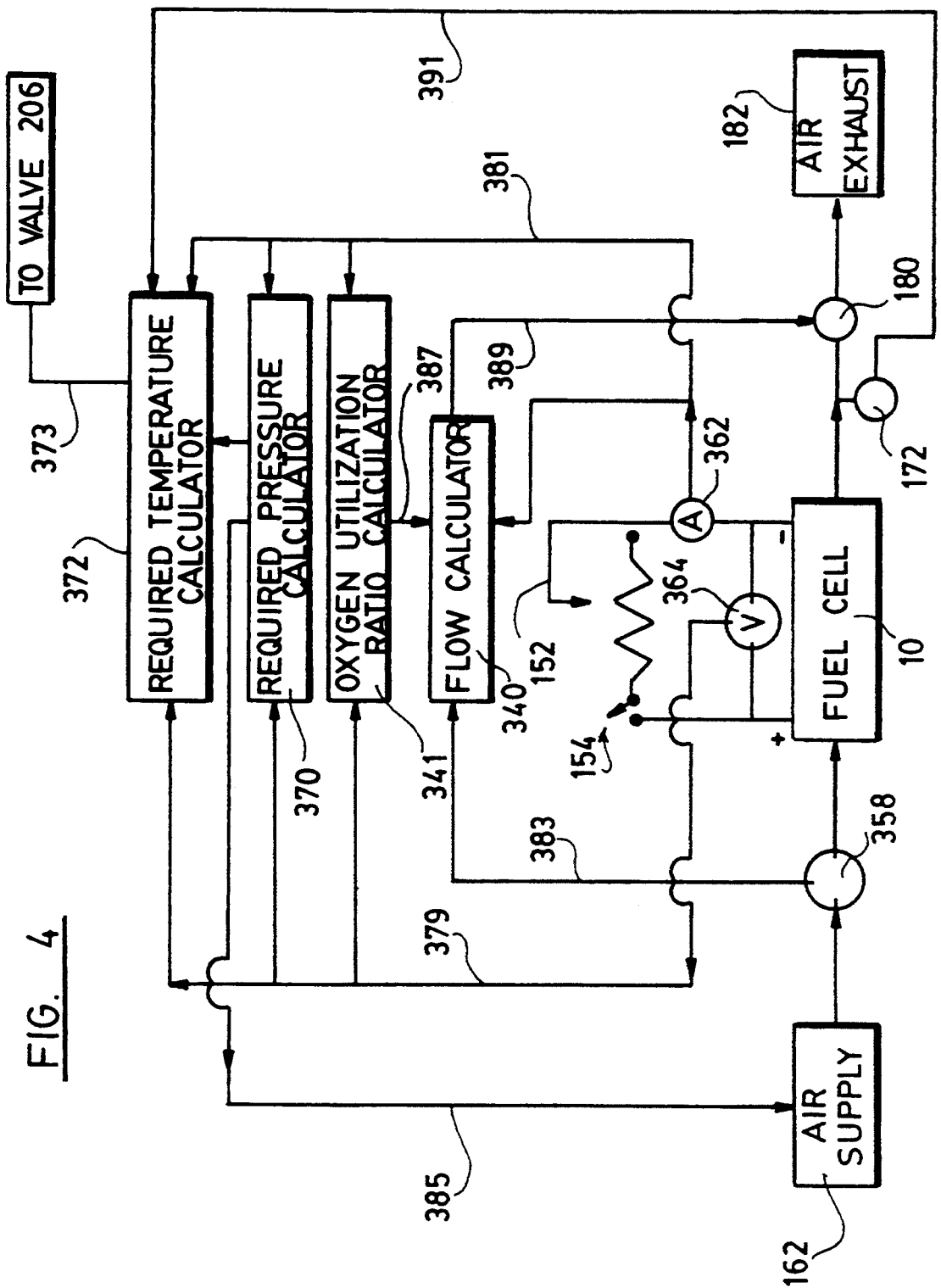
FIG. 4 is a flow diagram showing the control logic used to regulate the fuel cell system of FIGS. 2 and 3.

Referring now to FIG. 4, the control logic of the preferred embodiment is schematically illustrated. The required mass flow rate of the oxidant gas through the stack 10, and thus through the mass flow transducer 358, is determined by the flow calculator 340. The flow calculator 340 is responsive primarily to the current signal 381 from the current transducer 362 and secondarily to mass flow rate signal 383 from mass flow transducer 358.

The oxygen utilization ratio calculator 341 calculates the oxygen utilization ratio appropriate for optimal operation of the fuel cell and feeds this information via the signal 387 to the flow calculator 340. The optimal oxygen utilization ratio, or OUR, can be determined empirically, for the entire range of contemplated operating conditions, by configuring the fuel cell to operate under representative conditions, then automatically adjusting the OUR until optimal operation is achieved. One criterion of optimal operation, though by no means the only criterion, is a minimal parasitic power level at a given net fuel cell output power. (The net output power is the gross fuel cell output power minus the parasitic power).

The desired mass flow rate is implemented and maintained by changing the orifice size of the flow control valve 180 until the flow calculator 340 determines that the desired mass flow has been achieved. Any subsequent deviation from the desired mass flow rate is similarly detected at the mass flow transducer 358 and remedied by the flow calculator 340 through the command signal 389 to the flow control valve 180.

The apparatus illustrated in FIG. 4 also includes a voltage potential 364 and a current transducer 362 (both also shown in FIG. 2) for sensing the voltage and the current of the electrical output of the stack 10. These inputs are used to provide the information necessary to regulate the voltage of the stack at a constant value for various output or load currents.

Referring again to FIG. 1, the principle allowing the voltage of the stack to be regulated is illustrated. Curve 366 presents the relation of stack voltage to stack current when the oxidant gas is at 15 p.s.i.g. and the hydrogen supply is also at 15 p.s.i.g. Curve 366 is also taken at a fuel cell oxidant output temperature of 65° C. and an oxygen utilization ratio of 2.0. As the current increases, the voltage decreases (just as one would expect for any unregulated power supply). Curve 368 represents operation of the fuel cell with a hydrogen pressure and an oxidant gas pressure of 30 p.s.i.g., at a temperature of 70° C and an oxygen utilization ratio of 2.0.

A load current of about 125 amperes can be supplied at a potential of about 35 volts under the conditions of curve 366. If the current is increased for some reason to about 175 amperes, and all other conditions remain the same, the voltage will drop to about 32 volts. However, if the system responds to a change in the load by increasing the air and hydrogen pressures to 30 p.s.i.g. and the temperature to 70° C., which are the conditions of plot 368, then the voltage will be maintained at 35 volts, notwithstanding the change in the load or current of the fuel cell 10.

The pressure can be changed in much smaller or somewhat larger increments than 15 p.s.i., responsive to much smaller or somewhat greater changes in the current than 50 amperes, to achieve finer control or control over a wider range of conditions. But the principle of operation is the same.

Returning to FIG. 4, the principle just illustrated can be used to regulate the voltage of the stack 10. The voltmeter 364 determines the actual voltage of the cell 10, and sends this information to the calculator 370, which also stores data indicating the desired voltage of the stack; calculator 370 receives as a secondary input the actual stack current from the current transducer 362. The calculator 370 determines the stack pressure required to achieve the selected voltage. This stack pressure is communicated to the air source 162 via control signal 385 and to the corresponding structure of the hydrogen supply 112. These supplies are regulated to provide the desired pressure to the stack 10. (In this embodiment the hydrogen supply 112 is bottled hydrogen, and its output pressure is controlled by a conventional regulator.)

Similarly, the temperature in the stack can be changed, responsive primarily to changes in the voltage and secondarily to changes in the current of the cell, to regulate the voltage of the cell.

The temperature of the stack is normally and desirably changed in response to pressure changes, in part to keep the humidity of the gas supplies at a proper level for operation of the cell. Consequently, the pressure set point communicated by signal 391 is also communicated to a temperature calculator 372, which determines the desired stack temperature set point. A temperature control loop comprising temperature calculator 372 and the thermocouple 172 controls the operation of the valve 206 to pass the cooling water through or around the heat exchangers 210 and 312. Instead, or in addition, the fan 222 can be operated to increase cooling, stopped to decrease cooling, or its speed can be modulated to change the degree of cooling in the heat exchangers 210 and 312. In this way, the desired stack temperature can be achieved and maintained.

Referring to FIGS. 3 and 4, yet another aspect of the invention is a way to reduce the parasitic power drawn by the compressor motor 332 of the air source 162 when the stack is operated with a reduced or small load. It is conventional to operate the motor 332 in an "all or nothing" manner, so it is either rapidly replenishing the pressure in a generously sized receiver 338 or turned off when the pressure in the receiver 338 is adequate. If this prior scheme of air pressurization were combined with the present invention in which the oxidant gas pressure rises and falls in order to regulate the stack voltage, the motor 332 would draw full power in that system part of the time, providing a very high transient parasitic load and severe stack voltage transients.

According to the present invention, the parasitic load of the motor 332 is continuous, but as small as possible, because the speed and power draw of the motor 332, and thus those of the compressor 330, are reduced to reduce the reactant mass flow rate while maintaining a predetermined pressure in the receiver 338, and thus the stack 10, when the load current is low. The system can thus operate more efficiently at a low power draw.

Controlling the speed of the motor 332, instead of operating it intermittently, has other advantages as well. For example, the system is more easily controlled when one has the option of making relatively small changes to the speed of the motor 332, as well as the conventional options of turning it on or off. For another example, if the motor 332 is initially off, and is then switched on, a large starting electrical load is drawn as parasitic power from the fuel cell system, thus radically increasing the parasitic load momentarily and undesirably perturbing the system. Small changes in the speed of the motor 332 as it is running do not produce a starting load, so the parasitic power draw does not abruptly change when control is exerted over the oxidant pressure.

A collateral benefit of directly controlling the motor 332 to control pressure is that the receiver 338 no longer primarily stores a head of pressure, but merely dampens pressure variations. A much smaller receiver 338 is thus possible, saving space, weight, and equipment cost.

Another feature of the present invention is that the output signal of the mass flow transducer 358 at the oxidant gas input of the stack 10, the pressure delivered from the receiver 338, and the variable-flow valve 180 at the output line 178 downstream of the stack 10 can be coordinated to independently vary the pressure and the mass flow rate of the oxidant gas through the stack 10.

If the flow rate of the oxidant gas is to be increased without decreasing its pressure, the variable-flow valve 180 is opened until the transducer 358 detects that the desired mass flow rate has been obtained. Since an uncompensated increase in the mass flow rate would be accompanied by a pressure drop, at the same time the pressure within the receiver 338 is monitored by the transducer 344.

Any resulting tendency toward a pressure drop will be met by increasing the speed of the motor 332 sufficiently to restore the set-point pressure within the receiver 338. To the extent that this again changes the mass flow rate through the sensor 358 slightly, in a second iteration the valve 180 will again be adjusted to restore the flow rate through the transducer 358.

If the system is configured correctly, the successive perturbations of the pressure control and the mass flow control will be smaller and smaller, and a new state of operation at the new mass flow rate and the original pressure will quickly be achieved.

In an analogous way, a change in the system pressure, initiated by changing the speed of the motor 332 or otherwise changing the pressure within the receiver 338, can be made without changing the mass flow rate (with the exception of the small and temporary perturbations of the mass flow rate initiated by the pressure change).

The independent regulation of the pressure and mass flow allows independent changes of the oxygen utilization ratio and regulation of the voltage of the cell to adjust for varying current loads on the fuel cell.

What is claimed is:

1. A method for regulating the utilization of a reactant gas in an electric power generation system comprising at least one fuel cell, an input to said fuel cell of a reactant gas comprising at least one reactant constituent, and an output from said fuel cell of the reactant gas and an electrical output characterized by a voltage and a current, said method comprising the steps of:

A. selecting for said fuel cell a reactant utilization ratio, said ratio defined as the amount of the reactant constituent delivered to said reactant input per unit time divided by the amount of the reactant constituent consumed in said fuel cell per unit time;

B. determining a mass flow rate of the reactant gas through the fuel cell which will provide the selected reactant utilization ratio;

C. measuring the actual mass flow rate of the reactant gas at the reactant gas input and the output current of said fuel cell; and D. regulating the mass flow rate of the reactant gas at the reactant gas output of said fuel cell, responsive to the output current and the mass flow rate measured at said reactant gas input, to maintain said determined mass flow rate.

2. The method of claim 1, wherein said reactant constituent is oxygen.

3. The method of claim 1, wherein said reactant gas is air.

4. The method of claim 1, wherein said reactant constituent is hydrogen.

5. The method of claim 1, wherein said reactant gas is selected from the group consisting of hydrogen gas, natural gas reformate, methanol reformate, combinations thereof, and recycled products thereof.

6. The method of claim 1, comprising the further step of recycling at least a portion of the reactant constituent received at said fuel cell output to said fuel cell input.

7. A method of providing a substantially constant output voltage, notwithstanding output current variations, in an electric power generation system comprising at least one fuel cell, an input to said fuel cell of a reactant gas, and an electrical output characterized by a voltage and a current, said method comprising the steps of:
 A. selecting a nominal output voltage for said fuel cell,
 B. at least periodically determining the actual voltage delivered by the electrical output of said fuel cell, and
 C. regulating the pressure of the reactant gas in said fuel cell, in response to the voltage of the electrical output, so said nominal voltage is maintained at the electrical output.

8. The method of claim 7, comprising the further step of regulating the temperature of said fuel cell, in response to the voltage of the electrical output, so said nominal voltage is maintained at the electrical output.

9. A method of minimizing the parasitic power drain in an electric power generation system comprising at least one fuel cell having a variable electrical power output, a reactant gas input to said fuel cell, and a compressor driven by parasitic power drawn from said electrical power output for pressurizing the reactant gas within said fuel cell, said method comprising the steps of:
 A. determining that the output current of said fuel cell has changed, and
 B. changing the mass flow rate while maintaining substantially constant the pressure and reactant utilization ratio of the reactant in said fuel cell, in response to changes in said output current, thereby changing the amount of said parasitic power drawn from said electrical power output to drive said compressor.

10. The method of claim 9, wherein step (B) comprises changing the pressure and the mass flow rate while maintaining constant the reactant utilization ratio of the reactant in said fuel cell, in response to changes in said output current, thereby changing the amount of said parasitic power drawn from said electrical power output to drive said compressor.

11. The method of claim 9, wherein step (B) comprises changing the pressure, the mass flow rate and the reactant utilization ratio of the reactant in said fuel cell, in response to changes in said output current, thereby changing the amount of said parasitic power drawn from said electrical power output to drive said compressor.

12. A variable power output electric power generation system comprising:
 A. at least one fuel cell including an input of a reactant gas comprising a reactant constituent, an output of the reactant gas, and apparatus for reacting the reactant constituent to produce as an output electric power characterized by a voltage and a current;
 B. apparatus for determining a mass flow rate of the reactant gas which will provide a desired reactant constituent utilization ratio, said ratio defined as the amount of said reactant constituent delivered to said reactant gas input per unit time divided by the amount of the reactant constituent consumed in said fuel cell per unit time;
 C. a current sensor for measuring the output current of said fuel cell, said sensor generating a measured current signal;
 D. a mass flow rate sensor at the reactant gas input of said fuel cell for measuring the mass flow rate of the reactant gas, said mass flow rate sensor generating a measured flow rate signal; and
 E. a valve at said reactant gas output of said fuel cell for maintaining the determined mass flow rate of the reactant gas, said valve responsive to said measured current signal and said measured mass flow rate signal.

13. The power generation system of claim 12, wherein water vapor is present in the reactant gas as it exits the reactant gas output, and further comprising recovery apparatus provided downstream of said reactant gas output for recovering water from the reactant stream, and wherein said valve at said reactant gas output is located downstream of said recovery apparatus.

14. A voltage-regulated, variable-current electric power generation system comprising:
 A. at least one fuel cell including a reactant gas input and an electrical output characterized by a voltage and a current;
 B. apparatus responsive to the output voltage of said fuel cell for determining a pressure of the reactant gas in said fuel cell which will maintain the output voltage of said system at a predetermined level; and
 C. apparatus for substantially maintaining the determined pressure of the reactant gas in said fuel cell.

15. A variable power output electric power generation system comprising:
 A. at least one fuel cell having a reactant gas input and an electrical output characterized by a voltage and a current;
 B. a compressor driven by parasitic power drawn from said electrical power output for pressurizing the reactant gas within said fuel cell; and
 C. apparatus for changing one or more of the pressure, the mass flow rate and the reactant utilization ratio of the reactant gas in said fuel cell, in response to changes in said output current of said fuel cell, thereby changing the amount of said parasitic power drawn from said electrical power output to drive said compressor.

16. Apparatus for simultaneously regulating the mass flow rate and pressure of a reactant gas in an electric power generation system comprising at least one fuel cell having a reactant gas input for receiving a reactant gas and a reactant output for discharging the reactant gas and an electrical output characterized by a voltage and a current, said apparatus comprising:
 A. apparatus for maintaining the reactant gas at a predetermined pressure at said reactant gas input;
 B. apparatus for measuring said output current;
 C. apparatus for measuring the mass flow rate of the reactant gas at said reactant gas input; and D. apparatus for regulating the mass flow rate of the reactant gas at the reactant output of said fuel cell, responsive to said measured output current and said measured mass flow rate.

17. A method for regulating the utilization of a reactant gas in an electric power generation system comprising at least one fuel cell, an input to said fuel cell of a reactant gas comprising at least one reactant constituent, and an output from said fuel cell of the reactant gas and an electrical output characterized by a voltage and a current, said method comprising the steps of:
A. selecting for said fuel cell a reactant utilization ratio, said ratio defined as the amount of the reactant constituent delivered to said reactant input per unit time divided by the amount of the reactant constituent consumed in said fuel cell per unit time;
B. determining a mass flow rate of the reactant gas through the fuel cell which will provide the selected reactant utilization ratio;
C. measuring the actual mass flow rate of the reactant gas at the reactant gas input and the output current of said fuel cell;
D. regulating the mass flow rate of the reactant gas at the reactant gas output of said fuel cell, responsive to the output current and the mass flow rate measured at said reactant gas input, to maintain said determined mass flow rate; and
E. maintaining the reactant gas within said fuel cell.

18. The method of claim 7, comprising the further step of periodically determining the actual current delivered by the electrical output of said fuel cell.

19. The method of claim 7, comprising the further step of regulating the pressure of the reactant gas in said fuel cell, in response to the current of the electrical output, so said nominal voltage is maintained at the electrical output.

20. The method of claim 7, comprising the farther step of regulating the temperature of said fuel cell, in response to the current of the electrical output, so said nominal voltage is maintained at the electrical output.

21. The system of claim 14, further comprising an apparatus responsive to the output current of said fuel cell for determining pressure of the reactant gas in said fuel cell which will maintain the output voltage of said system.

22. The system of claim 14, further comprising an apparatus responsive to the output voltage of said fuel cell for determining a temperature of the reactant gas in said fuel cell which will maintain the output voltage of said system.

23. The system of claim 14, further comprising an apparatus responsive to the output current of said fuel cell for determining a temperature of the reactant gas in said fuel cell which will maintain the output voltage of said system.

* * * * *